United States Patent
Kim

(10) Patent No.: US 11,908,201 B2
(45) Date of Patent: Feb. 20, 2024

(54) APPARATUS FOR SUPPORTING DRIVING OF VEHICLE AND OPERATING METHOD OF THE SAME

(71) Applicants: Hyundai Motor Company, Seoul (KR); Kia Corporation, Seoul (KR)

(72) Inventor: Hyo Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 247 days.

(21) Appl. No.: 17/474,351

(22) Filed: Sep. 14, 2021

(65) Prior Publication Data

US 2022/0309282 A1    Sep. 29, 2022

(30) Foreign Application Priority Data

Mar. 24, 2021   (KR) .......................... 10-2021-0038257

(51) Int. Cl.
*G06V 20/58* (2022.01)
*B60W 40/09* (2012.01)
*G06V 10/25* (2022.01)

(52) U.S. Cl.
CPC .............. *G06V 20/58* (2022.01); *B60W 40/09* (2013.01); *G06V 10/25* (2022.01); *B60W 2420/42* (2013.01); *B60W 2420/52* (2013.01); *B60W 2554/4049* (2020.02)

(58) Field of Classification Search
CPC ....... G06V 20/58; G06V 10/25; B60W 40/09; B60W 2554/4049; B60W 2420/42; B60W 2420/52
See application file for complete search history.

(56) References Cited

U.S. PATENT DOCUMENTS

| | | | |
|---|---|---|---|
| 2008/0189000 A1* | 8/2008 | Duong | B60T 7/22 340/928 |
| 2018/0257641 A1* | 9/2018 | Spangenberg | G06V 20/588 |
| 2020/0103235 A1* | 4/2020 | Clark | G06V 40/19 |
| 2020/0148260 A1* | 5/2020 | Wu | B62D 15/0265 |
| 2020/0250438 A1* | 8/2020 | Schachter | G01C 21/30 |
| 2020/0262424 A1* | 8/2020 | Kong | G01C 21/20 |
| 2022/0357186 A1* | 11/2022 | Dharia | G06V 10/25 |

FOREIGN PATENT DOCUMENTS

KR    20150145685 A  * 12/2015

* cited by examiner

*Primary Examiner* — Pinalben Patel
(74) *Attorney, Agent, or Firm* — Fox Rothschild LLP

(57) ABSTRACT

An apparatus that supports driving of a vehicle may include a location check device that determines whether the vehicle is located within a circuit area, based on location information of the vehicle, a camera device that obtains an image around the vehicle, and a processor that recognizes a specific object from the obtained image based on whether the vehicle is located within the circuit area, sets a region of interest (ROI) with respect to the specific object, and performs image-processing on the ROI preferentially.

18 Claims, 7 Drawing Sheets

APPARATUS FOR SUPPORTING DRIVING OF VEHICLE AND OPERATING METHOD OF THE SAME

CROSS-REFERENCE TO RELATED APPLICATION

This application claims under 35 U.S.C. § 119(a) the benefit of Korean Patent Application No. 10-2021-0038257, filed in the Korean Intellectual Property Office on Mar. 24, 2021, the entire contents of which are incorporated herein by reference.

BACKGROUND

(a) Technical Field

The present disclosure relates to an apparatus for supporting driving of a vehicle and an operating method thereof.

(b) Description of the Related Art

Typically, a vehicle provides not only a means of transportation, but also incorporates audio and/or video technology. Accordingly, a vehicle infotainment system has been built to support a driver's driving and to provide various functions. The vehicle infotainment system may provide vehicle status information necessary for driving and direction and entertainment services such as DMB, navigation, music, radio, and the like. To provide these services, the vehicle infotainment system may receive DMB, GPS, or radio signals or may perform specified wired/wireless communication with a portable device in a vehicle.

On the other hand, consumers who purchase high-performance vehicles and enjoy off-street driving, such as on tracks or circuits are increasing. However, in the case of drivers who are driving in a circuit area for the first time, there is a need for guidance on various conditions in the circuit area for safe driving.

SUMMARY

An aspect of the present disclosure provides an apparatus for supporting driving of a vehicle that supports driving of a user's vehicle off-street, such as a track or circuit (hereinafter referred to as a "circuit area").

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for supporting driving of a vehicle may include a location check device that determines whether the vehicle is located within a circuit area, based on location information of the vehicle, a camera device that obtains an image around the vehicle, and a processor that recognizes a specific object from the obtained image based on whether the vehicle is located within the circuit area, sets a region of interest (ROI) with respect to the specific object, and performs image-processing on the ROI preferentially.

In an embodiment, the processor may recognize the specific object from the obtained image when the vehicle is located within the circuit area.

In an embodiment, the specific object may include a post located within the circuit area.

In an embodiment, the processor may recognize a signal flag by preferentially performing image-processing on the ROI.

In an embodiment, the apparatus may further include an output device configured to output content for the signal flag when the processor recognizes the signal flag.

In an embodiment, the processor may set a right-side area of the post to a first ROI when the post is located on a right side based on a traveling direction of the vehicle and may set a left-side area of the post to a second ROI when the post is located on a left side based on the traveling direction of the vehicle.

In an embodiment, the processor may obtain map information of the circuit area in which a location of the post is stored and may recognize the location of the post, which is to be reached with respect to the traveling direction of the vehicle, based on the map information and the location information of the vehicle.

In an embodiment, the processor may recognize the signal flag by preferentially performing image-processing on the first ROI when the post to be reached is located on a right side with respect to the traveling direction of the vehicle and may recognize the signal flag by preferentially performing image-processing on the second ROI when the post to be reached is located on a left side with respect to the traveling direction of the vehicle.

In an embodiment, the processor may recognize whether an unusual situation occurs, from the obtained image.

In an embodiment, the processor may recognize that the unusual situation occurs in at least one of a case that an obstacle is recognized in front of the vehicle in the obtained image, a case that another vehicle without movement in front of the vehicle is recognized in the obtained image, a case that a specific vehicle is recognized in front of the vehicle in the obtained image, a case that another vehicle is recognized behind the vehicle in the obtained image, and a case that the specific vehicle is recognized behind the vehicle in the obtained image.

In an embodiment, the processor may set an area other than the first ROI and the second ROI in the obtained image to a third ROI for recognizing whether the unusual situation occurs.

In an embodiment, the camera device may include a front camera that obtains an image in front of the vehicle and a rear camera that obtains an image behind the vehicle.

In an embodiment, the apparatus may further include a LIDAR sensor that detects and analyzes an obstacle in front and rear of the vehicle.

According to an aspect of the present disclosure, an operating method of a driving supporting apparatus of a vehicle may include identifying location information of the vehicle, determining whether the vehicle is located within a circuit area, obtaining an image around the vehicle, recognizing a specific object in the obtained image when the vehicle is located within the circuit area, setting an ROI with respect to the specific object, and performing image-processing on the ROI preferentially.

In an embodiment, the specific object may include a post located within the circuit area.

In an embodiment, the performing of the image-processing on the ROI preferentially may include recognizing a signal flag and recognizing whether an unusual situation occurs.

In an embodiment, the setting of the ROI with respect to the specific object may include setting a right-side area of the post to a first ROI when the post is located on a right side based on a traveling direction of the vehicle and setting a left-side area of the post to a second ROI when the post is located on a left side based on the traveling direction of the vehicle.

In an embodiment, the recognizing of the specific object in the obtained image when the vehicle is located within the circuit area may include obtaining map information in which a location of the post and recognizing the location of the post, which is to be reached with respect to the traveling direction of the vehicle, based on the map information and the location information of the vehicle.

In an embodiment, the recognizing of the specific object may include recognizing the signal flag by preferentially performing image-processing on the first ROI when the post to be reached is located on a right side with respect to the traveling direction of the vehicle and recognizing the signal flag by preferentially performing image-processing on the second ROI when the post to be reached is located on a left side with respect to the traveling direction of the vehicle.

In an embodiment, the setting of the ROI may include setting an area other than the first ROI and the second ROI in the obtained image to a third ROI for recognizing whether the unusual situation occurs.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
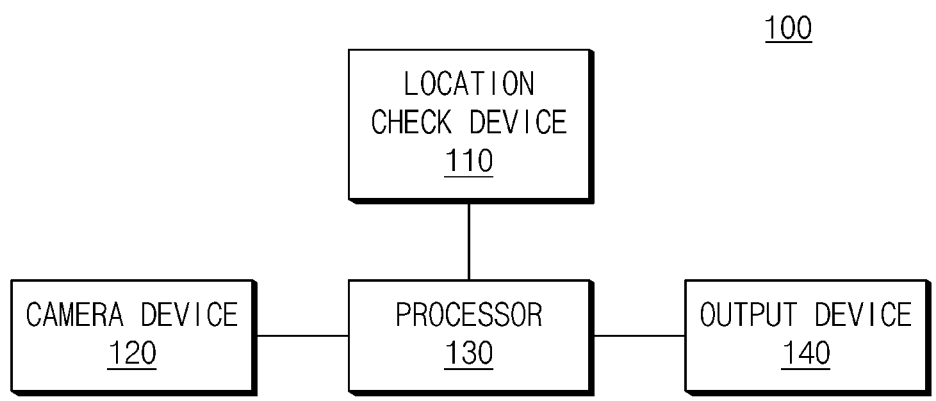
FIG. 1 is a block diagram illustrating an apparatus for supporting driving of a vehicle, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit" "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating an apparatus for supporting driving of a vehicle, according to an embodiment of the present disclosure.

Referring to FIG. 1, an apparatus 100 for supporting driving of a vehicle according to an embodiment of the present disclosure may include a location check device 110, a camera device 120, a processor 130, and an output device 140.

The location check device 110 may identify location information of a vehicle. For example, the location check device 110 may determine whether the vehicle is located in a circuit area, based on the location information of the vehicle. Herein, the circuit area may refer to an area including a road on which cars, motorcycles, or the like are driving, as a circular race track. Meanwhile, the circuit area may be a predefined area, and the location check device 110 may obtain information about the circuit area before the vehicle is driving.

The camera device 120 may obtain images around the vehicle. For example, the camera device 120 may include a front camera and a rear camera. The front camera may obtain images in front of the vehicle. The rear camera may obtain images behind the vehicle.

The processor 130 may recognize a specific object from the obtained image based on whether the vehicle is located in the circuit area, may set a region of interest (ROI) with respect to a specific object, and may preferentially perform image-process on the ROI.

When the vehicle is located within the circuit area, the processor 130 may recognize a specific object based on an image obtained by the camera device 120. For example, the specific object may include a post. That is, the processor 130 may recognize the post from the obtained image. Herein, the post may be a place provided to notify a driver of danger by sending a flag signal to the driver during a race or to notifying a race chairman of race situations. That is, a marshal may send a signal to the driver at the post by using a signal flag.

The processor 130 may set the ROI with respect to the post. For example, when the post is located on a right side with respect to the vehicle's traveling direction, the processor 130 may set a right area of the post to a first ROI. Furthermore, when the post is located on a left side with respect to the vehicle's traveling direction, the processor 130 may set a left area of the post to a second ROI.

It will be described in detail with reference to FIG. 2 that the processor 130 sets an ROI.

Figure 2:
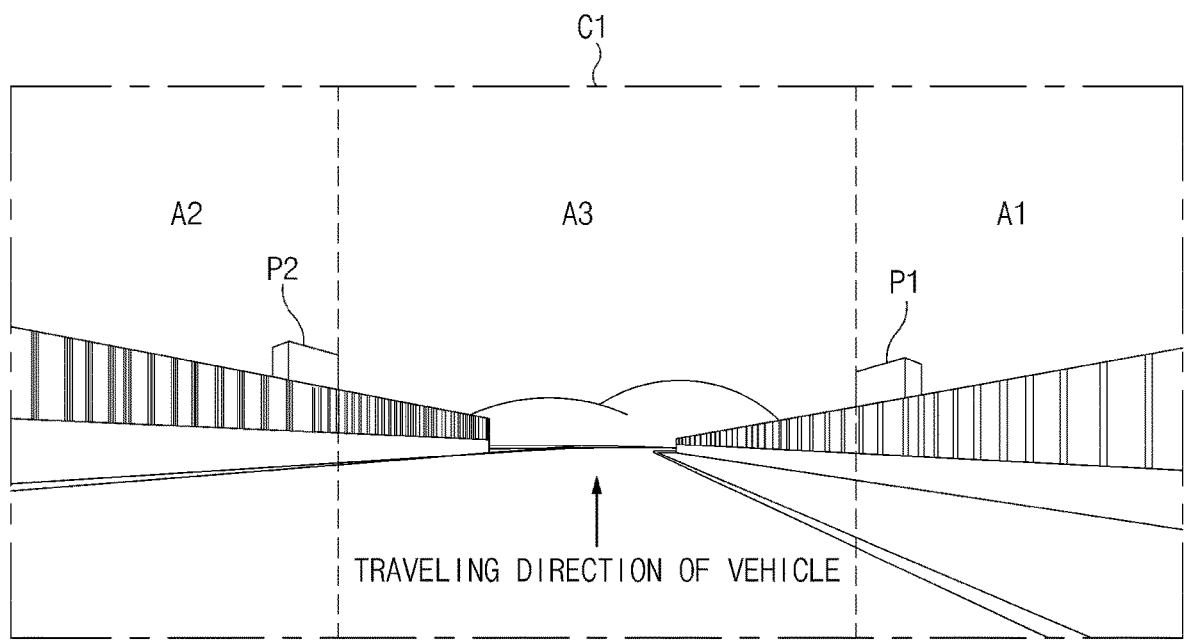
FIG. 2 is a diagram illustrating that a processor sets an ROI in a driving supporting apparatus of a vehicle, according to an embodiment of the present disclosure.

FIG. 2 is a diagram illustrating that a processor sets an ROI in a driving supporting apparatus of a vehicle, according to an embodiment of the present disclosure.

Referring to FIG. 2, in an image C1 obtained from the camera device 120, the processor 130 may recognize a post P1 or a post P2. The post P1 is located on a right side with respect to a traveling direction of a vehicle. The post P2 is located on a left side with respect to the traveling direction of the vehicle. When the post P1 is recognized on the right side with respect to the traveling direction of the vehicle, the processor 130 may set a right area A1 of the post P1 located on the right side to a first ROI. Moreover, when the post P2 is recognized on the left side with respect to the traveling direction of the vehicle, the processor 130 may set a left area A2 of the post P2 located on the right side to a second ROI.

However, referring to FIG. 2, it may be illustrated that the processor 130 sets the first ROI and the second ROI by simultaneously recognizing the post P1 located on the right side and the post P2 located on the left side with respect to the traveling direction of the vehicle. However, the post P1 located on the right side and the post P2 located on the left side with respect to the traveling direction of the vehicle are not recognized at the same time. For example, at least one of the post P1 and the post P2 may be recognized.

Returning to FIG. 1, the processor 130 may recognize a signal flag by preferentially performing image-processing on an ROI. For example, the signal flag may be an international signal guide flag for providing a notification of situations in a circuit defined by the International Automobile Federation, for example.

In particular, to recognize the signal flag, the processor 130 may perform intensively image-processing on the first ROI or the second ROI set with respect to a post. That is, the processor 130 may not recognize an object other than the signal flag in an ROI and may perform preferentially image-processing on only the signal flag in the ROI. Accordingly, the processor 130 may recognize the signal flag quickly as compared with a case that an ROI is not set.

The processor 130 may obtain map information of a circuit area, in which locations of posts are stored. For example, the processor 130 may obtain map information of the circuit area where locations of posts are stored in advance before the vehicle is driving.

The processor 130 may recognize the location of a post to be reached with respect to the traveling direction of the vehicle, based on a location of the vehicle identified by the location check device 110 and the map information of the circuit area where locations of posts are stored. For example, the processor 130 may recognize whether the post to be reached is located on a right side or a left side with respect to the traveling direction of the vehicle.

When the post to be reached is located on the right side with respect to the traveling direction of the vehicle, the processor 130 may recognize a signal flag by preferentially performing image-processing on the first ROI. Moreover, when the post to be reached is located on the left side with respect to the traveling direction of the vehicle, the processor 130 may recognize a signal flag by preferentially performing image-processing on the second ROI.

A method of recognizing a location of a post to be reached will be described in detail with reference to FIG. 3.

Figure 3:
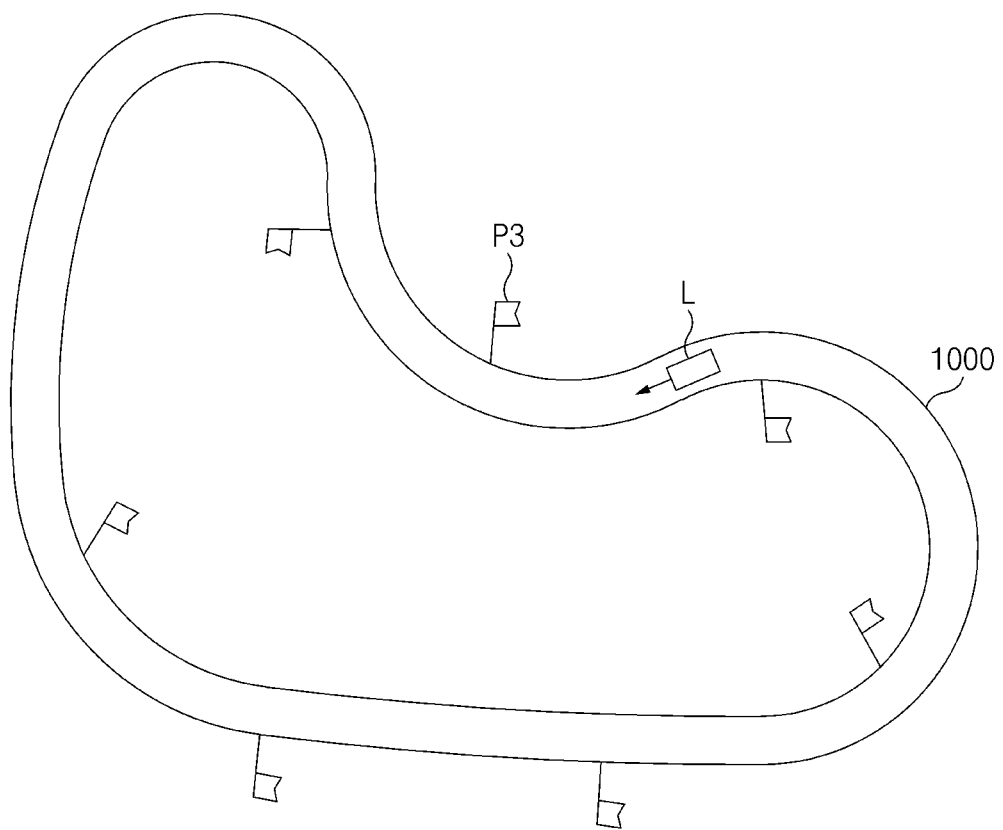
FIG. 3 is a view illustrating that a processor recognizes a location of a post to be reached with respect to a traveling direction of a vehicle based on map information of a circuit area, in which the location of the post is stored, in a driving supporting device of a vehicle, according to an embodiment of the present disclosure.

FIG. 3 is a view illustrating that a processor recognizes a location of a post to be reached with respect to a traveling direction of a vehicle based on map information of a circuit area, in which the location of the post is stored, in a driving supporting device of a vehicle, according to an embodiment of the present disclosure.

Referring to FIG. 3, the location check device 110 may identify a location L of a vehicle being driven. The processor 130 may obtain map information 1000 of a circuit area in which a location of a post is stored. The processor 130 may recognize a location of a post P3 to be reached with respect to the traveling direction of the vehicle, based on the location L of the vehicle being driven and the map information 1000 of the circuit area where the location of the post are stored. For example, the processor 130 may determine that the post P3 to be reached from the location L of the vehicle being driven is located on the right side with respect to the traveling direction of the vehicle. In other words, the processor 130 may recognize that the post P3 to be reached is located on the right side with respect to the vehicle's traveling direction, and then may recognize the signal flag by preferentially image-processing on the first ROI.

Referring again to FIG. 1, the processor 130 may recognize whether an unusual situation has occurred, from the obtained image. For example, the processor 130 may recognize that an unusual situation has occurred when an obstacle is recognized in front of the vehicle in the obtained image, when another vehicle that does not move is recognized in front of the vehicle, when a specific vehicle is recognized in front of the vehicle, when another vehicle is recognized behind the vehicle, or when a specific vehicle is recognized behind the vehicle. However, a case that an unusual situation has occurred is not limited to the above-mentioned cases. In addition, the processor 130 may recognize that an unusual situation has occurred around the vehicle.

Meanwhile, the specific vehicle may be a safety car (e.g., an emergency vehicle, a pace car, etc.). For example, the safety car may be a command vehicle for resolving a problem when the problem occurs on the circuit. When the safety car is recognized, the driving support device 100 of a vehicle may induce safe driving by notifying a driver that the safety car is recognized.

The processor 130 may set an area other than the first ROI and the second ROI in the obtained image to a third ROI for recognizing whether an unusual situation has occurred. For example, the processor 130 may preferentially perform image-processing on the signal flag in the first ROI and the second ROI and may preferentially perform image-processing on the third ROI to recognize whether an unusual situation has occurred.

In particular, referring to FIG. 2, the processor 130 may set an area other than the first ROI A1 and the second ROI A2 in the image C1, which is obtained by the camera device 120, to the third ROI A3 for recognizing whether an unusual situation has occurred.

When the processor 130 recognizes a signal flag the output device 140 may output content for the signal flag. In particular, when the processor 130 recognizes the signal flag, the output device 140 may visualize the signal flag so as to be output to a screen and may output descriptions of the signal flag to the screen. In addition, the output device 140 may guide descriptions of the recognized signal flag through voice.

When the processor 130 recognizes that an unusual situation has occurred, the output device 140 may output a warning sound. For example, when the processor 130 recognizes another vehicle that does not move in front of the vehicle, the output device 140 may output an accident caution warning sound. When the processor 130 recognizes an obstacle in front of the vehicle, the output device 140 may output an obstacle warning sound. When the processor 130 recognizes a safety car in front or rear of the vehicle, the output device 140 may output a no-passing warning sound.

Also, when the approach of the safety car is recognized behind the vehicle, the output device 140 may output the no-passing warning sound. When the processor 130 recognizes the approach of another vehicle behind the vehicle, the output device 140 may guide a driver through voice such that the driver is capable of determining a driving method of another vehicle in the rear. That is, the driver may interfere with the passing of another vehicle in the rear with respect to the guided voice.

In an embodiment of the present disclosure, the driving supporting apparatus 100 of the vehicle may further include a LIDAR sensor (not illustrated).

For example, the LIDAR sensor (not illustrated) may detect and analyze obstacles in front and rear of the vehicle. That is, the LIDAR sensor (not illustrated) may recognize an obstacle not recognized by the camera device 110 and may support the role of the camera device 110.

The driving supporting apparatus 100 of the vehicle may allow the driver to enjoy the performance of the vehicle on a circuit and to participate in a racing match, based on the above-described operations of the location check device 110, the camera device 120, the processor 130, and the output device 140. In particular, the driving supporting apparatus 100 of the vehicle may obtain an image around the vehicle, may recognize a post from the obtained image, may set an ROI with respect to the post, and may preferentially process the ROI to recognize a signal flag and the occurrence of an unusual situation. The driving supporting apparatus 100 of the vehicle may guide the driver through the output device 140 so as to recognize the signal flag and the occurrence of an unusual situation. The driver may drive the vehicle in a circuit area based on the guided information In other words, the driver may accurately recognize a situation in the circuit through an operation of the driving supporting apparatus 100 of the vehicle and may enjoy driving in the circuit for a high-performance vehicle.

Hereinafter, an operating method of the driving supporting apparatus 100 of the vehicle will be described with reference to FIG. 4.

Figure 4:
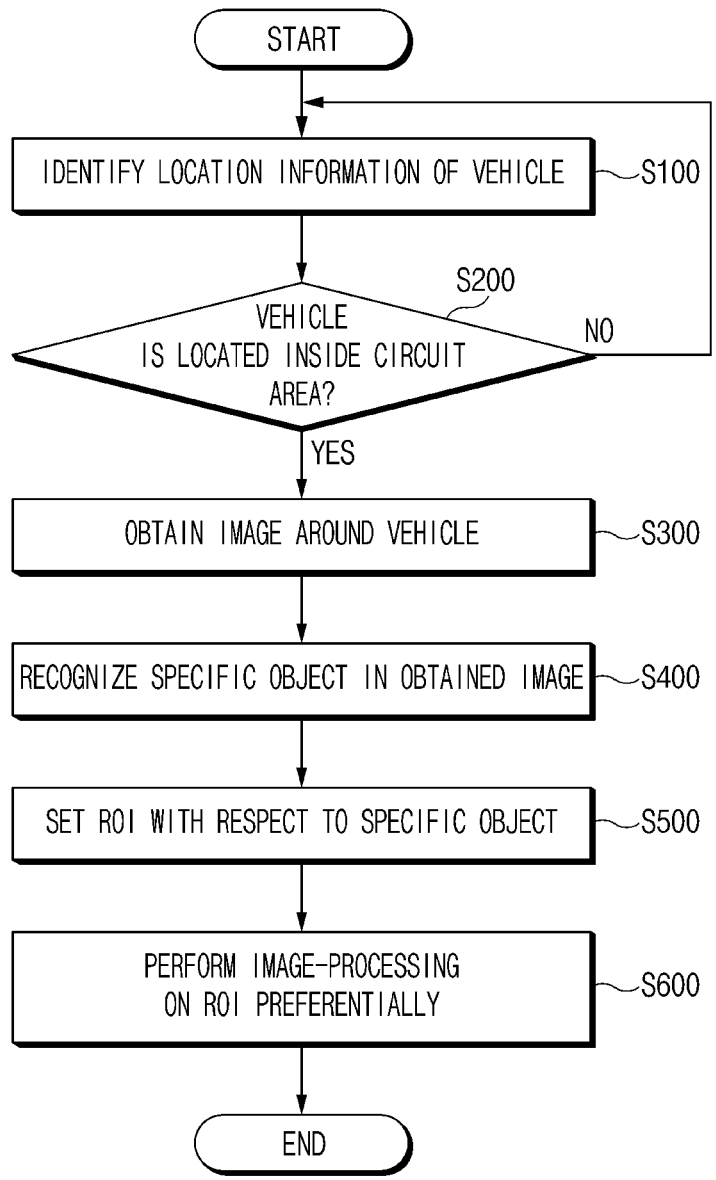
FIG. 4 is a flowchart illustrating an operating method of a driving supporting apparatus of a vehicle, according to an embodiment of the present disclosure.

FIG. 4 is a flowchart illustrating an operating method of a driving supporting apparatus of a vehicle, according to an embodiment of the present disclosure.

Referring to FIG. 4, an operating method of the driving supporting apparatus 100 of a vehicle may include step S100 of identifying location information of a vehicle, step S200 of determining whether the vehicle is located within a circuit area, step S300 of obtaining an image around the vehicle, step S400 of recognizing a specific object in the obtained image when the vehicle is located within the circuit area, step S500 of setting an ROI with respect to the specific object, and step S600 of performing preferentially image-processing on the ROI.

In step S100 of identifying location information of the vehicle, the location check device 110 may identify location information of the vehicle. For example, the location check device 110 may obtain the location information of the vehicle from GPS of the vehicle or may directly identify a location of the vehicle.

In step S200 of determining whether the vehicle is located within the circuit area, the location check device 110 may determine whether the vehicle is located within the circuit area. In particular, in step S200 of determining whether the vehicle is located within a circuit area, the location check device 110 may determine whether the vehicle is located within the circuit area, by comparing the identified location information of the vehicle with information about the circuit area. In the meantime, the information about the circuit area may be a predetermined value. The location check device 110 may obtain the information about the circuit area before the vehicle is driving.

Meanwhile, in step S200 of determining whether the vehicle is located within the circuit area, the driving supporting apparatus 100 of the vehicle may terminate an operation of supporting driving of the vehicle when the vehicle is not located inside the circuit area.

In step S300 of obtaining the image around the vehicle, the camera device 120 may obtain the image around the vehicle. In particular, the camera device 120 may obtain an image in front of the vehicle from a front camera and may obtain an image in the rear of the vehicle from a rear camera.

In step S400 of recognizing the specific object in the obtained image when the vehicle is located within the circuit area, the processor 130 may recognize the specific object when the vehicle identified by the location check device 110 is located inside the circuit area. For example, in step S400 of recognizing the specific object in the obtained image when the vehicle is located within the circuit area, the specific object may include a post located within the circuit area, and the processor 130 may recognize the post from the image obtained by the camera device 120.

In step S500 of setting the ROI with respect to the specific object, the processor 130 may set the ROI with respect to the recognized specific object. For example, in step S500 of setting the ROI with respect to the specific object, the processor 130 may set the ROI with respect to the post.

In particular, in step S500 of setting the ROI with respect to the specific object, the processor 130 may set a right area of the post to a first ROI when the recognized post is located on a right side with respect to the vehicle's traveling direction. Furthermore, when the recognized post is located on a left side with respect to the vehicle's traveling direction, the processor 130 may set a left area of the post to a second ROI.

In step S600 of preferentially performing image-processing on the ROI, the processor 130 may recognize predetermined objects by preferentially performing image-processing on the set ROI. For example, in step S600 of preferentially performing image-processing on the ROI, the processor 130 may recognize the signal flag and may recognize whether an unusual situation has occurred.

In the meantime, in step S500 of setting the ROI with respect to the specific object, the processor 130 may set an area other than the first ROI and the second ROI in the obtained image to a third ROI for recognizing whether an unusual situation has occurred. For example, the processor 130 may recognize the signal flag by preferentially processing the first ROI and the second ROI, and may recognize whether an unusual situation occurs, by preferentially processing the third ROI.

The operating method of the driving supporting apparatus 100 of the vehicle according to the embodiment of the present disclosure may allow a driver to recognize situations in a circuit area. In particular, in step S100 of identifying location information of the vehicle, the location check device 110 may identify the location of the vehicle. In step S200 of determining whether the vehicle is located within the circuit area, the location check device 100 may determine whether the vehicle is located inside the circuit area and then may switch the mode of a vehicle system to a driving support mode when the vehicle is located inside the circuit area. Also, in the operating method of the driving supporting apparatus 100 of the vehicle, in step S300 of obtaining the image around the vehicle, the camera device 120 may obtain images of the front and rear of the vehicle; in step S400 of recognizing the specific object in the obtained image when the vehicle is located within the circuit area, the processor 130 may recognize a post from the obtained image; and, in step S500 of setting the ROI with respect to the specific object, the processor 130 may set a first ROI, a second ROI, and a third ROI with respect to the post. As a result, in the operating method of the driving supporting apparatus 100 of the vehicle, in step S600 of preferentially performing image-processing on the ROI, the processor 130 may recognize the signal flag by preferentially processing the first ROI or the second ROI and then may recognize whether an unusual situation has occurred around the vehicle, by preferentially performing image-processing on the third ROI. That is, the driving supporting apparatus 100 of the vehicle may guide the driver to a signal flag inside the circuit or the occurrence of an unusual situation around the vehicle, by performing the above-described operations. Accordingly, the driver's driving inside the circuit area may be supported.

Hereinafter, step S400 to step S600 will be described in detail with reference to FIG. 5.

Figure 5:
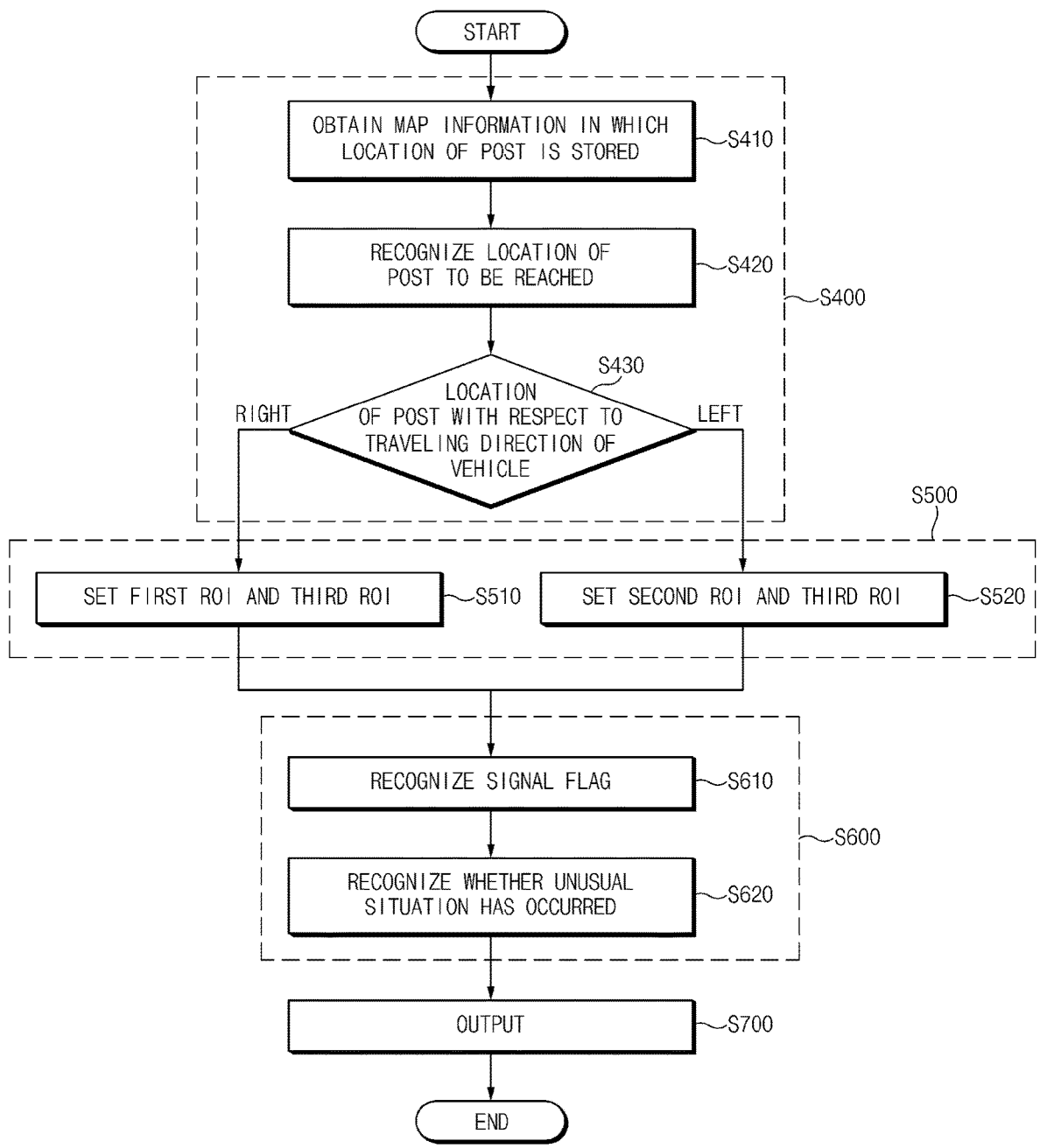
FIG. 5 is a flowchart illustrating an operation of recognizing a specific object in an obtained image, an operation of setting an ROI with respect to the specific object, and an operation of preferentially performing image-processing on the ROI in an operating method of a driving supporting apparatus of vehicle, according to an embodiment of the present disclosure.

FIG. 5 is a flowchart illustrating an operation of recognizing a specific object in an obtained image, an operation of setting an ROI with respect to the specific object, and an operation of preferentially performing image-processing on the ROI in an operating method of a driving supporting apparatus of vehicle, according to an embodiment of the present disclosure.

Referring to FIG. 5, step S400 to step S600 may include step S410 of obtaining map information in which a location of a post is stored, step S420 of recognizing the location of a post to be reached, step S430 of determining the location of the post with respect to a traveling direction of a vehicle, step S510 of setting a first ROI and a third ROI, step S520 of setting a second ROI and the third ROI, step S610 of recognizing a signal flag, and step S620 of recognizing whether an unusual situation has occurred.

Specifically, step S400 may include step S410 to step S430. Step S500 may include step S510 and step S520. Step S600 may include step S610 and step S620.

In step S410 of obtaining the map information in which the location of the post is stored, the processor 130 may obtain map information of a circuit in which the location of the post in the circuit area is stored. For example, the processor 130 may obtain a high-resolution map of the circuit, in which the location of the post is stored, before the vehicle is driving, and then may also load the high-resolution map of the circuit through wireless communication while the vehicle is driving.

In step S420 of recognizing the location of the post to be reached, the processor 130 may recognize the location of the post to be reached with respect to the traveling direction of the vehicle, by comparing the location information of the vehicle identified by the location check device 110 with the map information of the circuit in which the location of the post is stored. For example, in step S420 of recognizing the location of a post to be reached, when recognizing the location of the post to be reached with respect to the traveling direction of the vehicle, the processor 130 may recognize a post by intensively processing the recognized location of the post to be reached from the obtained image.

In step S430 of determining the location of the post with respect to the traveling direction of the vehicle, the processor 130 may determine the recognized location of the post with respect to the traveling direction of the vehicle. For example, in step S430 of determining the location of the post with respect to the traveling direction of the vehicle, the processor 130 may determine whether the recognized post is located on the right side or the left side with respect to the traveling direction of the vehicle.

In step S510 of setting the first ROI and the third ROI and step S520 of setting the second ROI and the third ROI, the processor 130 may set the first ROI, the second ROI, and the third ROI with respect to the recognized location of the post.

For example, in step S510 of setting the first ROI and the third ROI, when the recognized post is located on the right side with respect to the traveling direction of the vehicle, the processor 130 may set a right side area to the first ROI with respect to the post in the image obtained by the camera device 120, and may set the other area to the third ROI.

In addition, in step S520 of setting the second ROI and the third ROI, when the recognized post is located on the left side with respect to the traveling direction of the vehicle, the processor 130 may set a left side area to the second ROI with respect to the post in the image obtained by the camera device 120, and may set the other area to the third ROI.

In step S610 of recognizing the signal flag, the processor 130 may recognize the signal flag by preferentially performing image-processing on an ROI. For example, in step S610 of recognizing the signal flag, the processor 130 may recognize the signal flag by preferentially performing image-processing on the first ROI or the second ROI, which are set with respect to the post.

In step S620 of recognizing whether the unusual situation has occurred, the processor 130 may recognize whether an unusual situation has occurred around the vehicle, by preferentially performing image-processing on the ROI. For example, in step S620 of recognizing whether the unusual situation has occurred, the processor 130 may recognize whether the unusual situation has occurred, by preferentially performing image-processing on the third ROI other than the first ROI and the second ROI, which are set with respect to the post, in the obtained image.

In particular, in step S620 of recognizing whether the unusual situation has occurred, the processor 130 may recognize that the unusual situation has occurred when an obstacle is recognized in front of the vehicle in the image obtained by the camera device 120, when another vehicle that does not move is recognized in front of the vehicle, when a specific vehicle is recognized in front of the vehicle, when another vehicle is recognized behind the vehicle, or when a specific vehicle is recognized behind the vehicle. Meanwhile, the specific vehicle may include a safety car.

Meanwhile, referring to FIG. 5, step S610 of recognizing the signal flag and step S620 of recognizing whether the unusual situation has occurred are shown to be performed in order, but are not limited thereto. That is, the processor 130 may perform step S620 before step S610 or may perform step S620 simultaneously with step S610.

The operating method of the driving supporting apparatus 100 of a vehicle according to an embodiment of the present disclosure may further include step S700 of outputting information.

In step S700 of outputting information, the output device 140 may output information about the recognized signal flag to a user. For example, when the processor 130 recognizes the signal flag, the output device 140 may visualize the signal flag so as to be output to a screen, may output the description about the signal flag to the screen, and may guide the driver with the description about the signal flag through voice.

In step S700 of outputting the information, when the processor 130 recognizes an unusual situation, the output device 140 may notify the driver of content for the recognized unusual situation.

Hereinafter, step S620 of recognizing whether the unusual situation has occurred and step S700 of outputting the information will be described in detail with reference to FIGS. 6 and 7.

Figure 6:
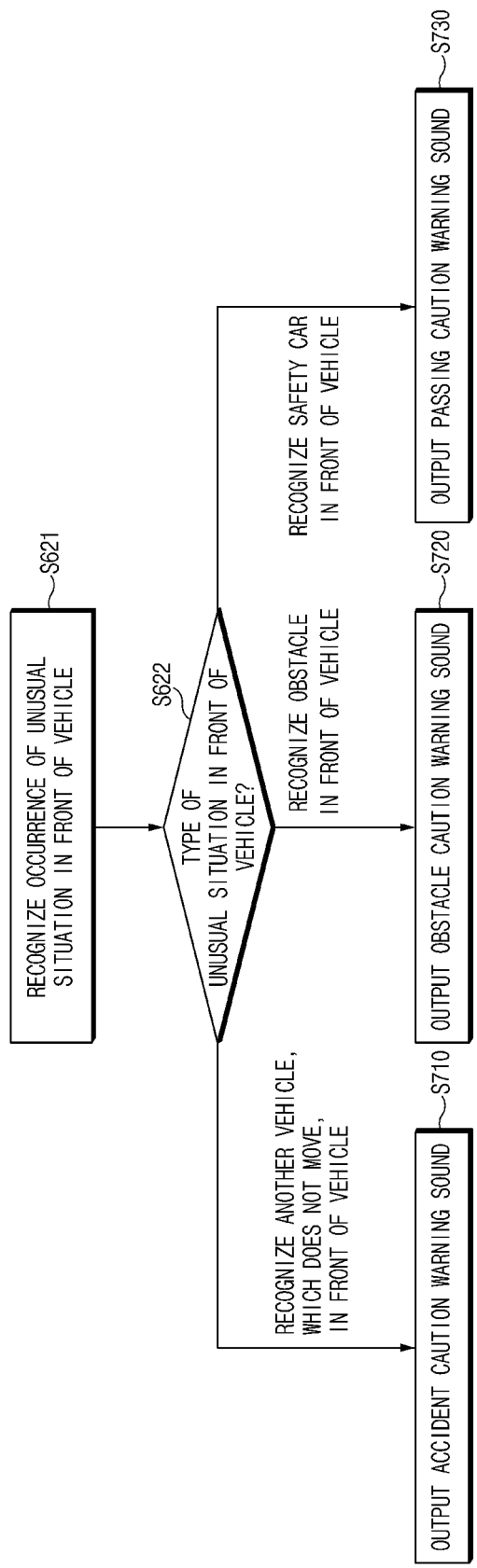
FIGS. 6 and 7 are flowcharts illustrating an operation of recognizing whether an unusual situation occurs and an output operation in an operating method of a driving supporting apparatus of a vehicle, according to an embodiment of the present disclosure.
Figure 7:
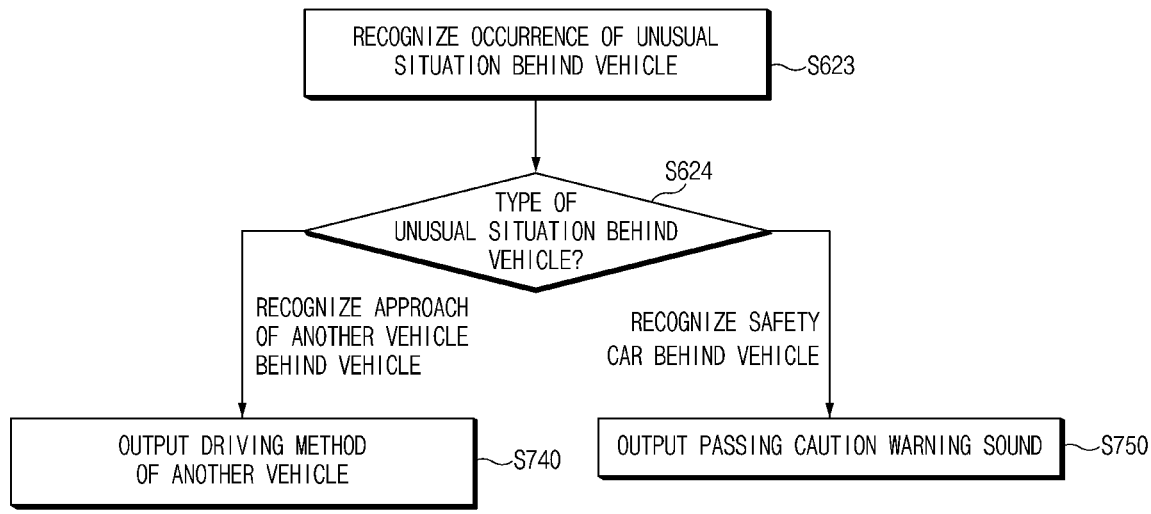

FIGS. 6 and 7 are flowcharts illustrating an operation of recognizing whether an unusual situation occurs and an output operation in an operating method of a driving supporting apparatus of a vehicle, according to an embodiment of the present disclosure.

Referring to FIG. 6, step S620 and step S700 may include step S621 of recognizing the occurrence of an unusual situation in front of a vehicle, step S622 of determining a type of the unusual situation in front of the vehicle, step S710 of outputting an accident caution warning sound, step S720 of outputting an obstacle caution waning sound, and step S730 of outputting a passing caution warning sound.

In particular, in step S621 of recognizing the occurrence of the unusual situation in front of the vehicle, the processor 130 may recognize whether the unusual situation has occurred in front of the vehicle. In step S622 of determining the type of the unusual situation in front of the vehicle, the processor 130 may determine the type of the unusual situation that has occurred in front of the vehicle. That is, when the processor 130 recognizes another vehicle, which does not move, in front of the vehicle, the output device 140 may output an accident caution warning sound (S710). When the processor 130 recognizes an obstacle in front of the vehicle, the output device 140 may output an obstacle caution warning sound (S720). Furthermore, when the processor 130 recognizes a safety car in front of the vehicle, the output device 140 may output a passing caution warning sound (S730).

Referring to FIG. 7, step S620 and step S700 may include step S623 of recognizing the occurrence of an unusual situation behind a vehicle, step S624 of determining a type of the unusual situation behind the vehicle, step S740 of outputting a driving method of another vehicle, and step S750 of outputting a passing caution warning sound.

In particular, in step S623 of recognizing the occurrence of the unusual situation behind the vehicle, the processor 130 may recognize whether the unusual situation has occurred behind the vehicle being driven. In step S624 of determining the type of the unusual situation behind the vehicle, the processor 130 may determine the recognized type of the unusual situation behind the vehicle. For example, when the processor 130 recognizes the approach of another vehicle behind the vehicle, the processor 130 may analyze the driving method of the other vehicle behind the vehicle, and the output device 140 may output the driving method of the other vehicle (S740). Also, in step S623 of recognizing the occurrence of the unusual situation behind the vehicle, when the processor 130 recognizes the safety car behind the vehicle, the output device 140 may output a passing caution warning sound (S750).

That is, a user may recognize a signal flag and may recognize the occurrence of an unusual situation, through an operation of the driving supporting apparatus 100 of a vehicle according to the embodiment of the present disclosure. Accordingly, the driver may safely drive a vehicle in a circuit and also may enjoy high-performance driving.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

An apparatus for supporting driving of a vehicle according to an embodiment of the present disclosure may support driving of a user's vehicle within a circuit area.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for supporting driving of a vehicle, the apparatus comprising:

a location check device configured to determine whether the vehicle is located within a circuit area, based on location information of the vehicle;
a camera device configured to obtain an image around the vehicle; and
a processor configured to:
recognize a specific object from the obtained image based on whether the vehicle is located within the circuit area;
set a region of interest (ROI) with respect to the specific object; and
perform image-processing on the ROI preferentially,
wherein the specific object includes a post configured to provide a signal to a driver of the vehicle using a signal flag, and
wherein the post is located within the circuit area.

2. The apparatus of claim 1, wherein the processor is configured to:
recognize the specific object from the obtained image when the vehicle is located within the circuit area.

3. The apparatus of claim 1, wherein the processor is configured to:
recognize the signal flag by preferentially performing image-processing on the ROI.

4. The apparatus of claim 3, further comprising:
an output device configured to output content for the signal flag when the processor recognizes the signal flag.

5. The apparatus of claim 3, wherein the processor is configured to:
set a right-side area of the post to a first ROI when the post is located on a right side based on a traveling direction of the vehicle; and
set a left-side area of the post to a second ROI when the post is located on a left side based on the traveling direction of the vehicle.

6. The apparatus of claim 5, wherein the processor is configured to:
obtain map information of the circuit area in which a location of the post is stored; and
recognize the location of the post, which is to be reached with respect to the traveling direction of the vehicle, based on the map information and the location information of the vehicle.

7. The apparatus of claim 6, wherein the processor is configured to:
recognize the signal flag by preferentially performing image-processing on the first ROI when the post to be reached is located on a right side with respect to the traveling direction of the vehicle; and
recognize the signal flag by preferentially performing image-processing on the second ROI when the post to be reached is located on a left side with respect to the traveling direction of the vehicle.

8. The apparatus of claim 4, wherein the processor is configured to:
recognize whether an unusual situation occurs, from the obtained image.

9. The apparatus of claim 8, wherein the processor is configured to:
recognize that the unusual situation occurs in at least one of a case that an obstacle is recognized in front of the vehicle in the obtained image, a case that another vehicle without movement in front of the vehicle is recognized in the obtained image, a case that a specific vehicle is recognized in front of the vehicle in the obtained image, a case that another vehicle is recognized behind the vehicle in the obtained image, and a case that the specific vehicle is recognized behind the vehicle in the obtained image.

10. The apparatus of claim 8, wherein the processor is configured to:
set an area other than the first ROI and the second ROI in the obtained image to a third ROI for recognizing whether the unusual situation occurs.

11. The apparatus of claim 1, wherein the camera device includes:
a front camera configured to obtain an image in front of the vehicle; and
a rear camera configured to obtain an image behind the vehicle.

12. The apparatus of claim 1, further comprising:
a LIDAR sensor configured to detect and analyze an obstacle in front and rear of the vehicle.

13. An operating method of a driving supporting apparatus of a vehicle, the method comprising:
identifying location information of the vehicle;
determining whether the vehicle is located within a circuit area;
obtaining an image around the vehicle;
recognizing a specific object in the obtained image when the vehicle is located within the circuit area;
setting an ROI with respect to the specific object; and
performing image-processing on the ROI preferentially,
wherein the specific object includes a post configured to provide a signal to a driver of the vehicle using a signal flag, and
wherein the post is located within the circuit area.

14. The method of claim 13, wherein the performing of the image-processing on the ROI preferentially includes:
recognizing the signal flag; and
recognizing whether an unusual situation occurs.

15. The method of claim 14, wherein the setting of the ROI with respect to the specific object includes:
setting a right-side area of the post to a first ROI when the post is located on a right side based on a traveling direction of the vehicle; and
setting a left-side area of the post to a second ROI when the post is located on a left side based on the traveling direction of the vehicle.

16. The method of claim 15, wherein the recognizing of the specific object in the obtained image when the vehicle is located within the circuit area includes:
obtaining map information in which a location of the post; and
recognizing the location of the post, which is to be reached with respect to the traveling direction of the vehicle, based on the map information and the location information of the vehicle.

17. The method of claim 16, wherein the recognizing of the specific object includes:
recognizing the signal flag by preferentially performing image-processing on the first ROI when the post to be reached is located on a right side with respect to the traveling direction of the vehicle; and
recognizing the signal flag by preferentially performing image-processing on the second ROI when the post to be reached is located on a left side with respect to the traveling direction of the vehicle.

18. The method of claim 15, wherein the setting of the ROI includes:
setting an area other than the first ROI and the second ROI in the obtained image to a third ROI for recognizing whether the unusual situation occurs.

* * * * *